US012345657B2

(12) United States Patent
Saito et al.

(10) Patent No.: US 12,345,657 B2
(45) Date of Patent: Jul. 1, 2025

(54) METHOD FOR INSPECTING DAMAGE IN REVERSE OSMOSIS MEMBRANE

(71) Applicant: Toray Industries, Inc., Tokyo (JP)

(72) Inventors: Kenji Saito, Ehime (JP); Koji Nakatsuji, Ehime (JP); Hiroo Takabatake, Otsu (JP); Shinya Shimoda, Ehime (JP)

(73) Assignee: Toray Industries, Inc., Tokyo (JP)

( * ) Notice: Subject to any disclaimer, the term of this patent is extended or adjusted under 35 U.S.C. 154(b) by 135 days.

(21) Appl. No.: 18/281,406

(22) PCT Filed: Mar. 25, 2022

(86) PCT No.: PCT/JP2022/014666
§ 371 (c)(1),
(2) Date: Sep. 11, 2023

(87) PCT Pub. No.: WO2022/203078
PCT Pub. Date: Sep. 29, 2022

(65) Prior Publication Data
US 2024/0159687 A1 May 16, 2024

(30) Foreign Application Priority Data
Mar. 26, 2021 (JP) .................. 2021-052866

(51) Int. Cl.
*G01N 21/95* (2006.01)
*B01D 61/02* (2006.01)
(Continued)

(52) U.S. Cl.
CPC ........... *G01N 21/95* (2013.01); *B01D 61/025* (2013.01); *B01D 61/10* (2013.01); *B01D 63/10* (2013.01); *B01D 65/109* (2022.08); *G01N 1/34* (2013.01)

(58) Field of Classification Search
CPC .... G01N 21/95; G01N 1/34; G01N 2021/646; G01N 21/91; B01D 61/025; B01D 61/10;
(Continued)

(56) References Cited

U.S. PATENT DOCUMENTS 8,596,110 B2 * 12/2013 Rahman ................. G01N 13/04
73/38
2015/0352751 A1 12/2015 Ramanan et al.
(Continued)

FOREIGN PATENT DOCUMENTS

CN 103551045 A 2/2014
JP 06254358 A 9/1994
(Continued)

OTHER PUBLICATIONS

International Search Report and Written Opinion for International Application No. PCT/JP2022/014666, dated May 10, 2022, 5 pages.
(Continued)

*Primary Examiner* — Tony Ko
(74) *Attorney, Agent, or Firm* — Buchanan Ingersoll & Rooney PC

(57) ABSTRACT

The present invention relates to a damage inspection method for a reverse osmosis membrane, in which at least one of: presence or absence of physical damage; and a degree of physical damage in a reverse osmosis membrane is inspected based on presence or absence of a stained area on at least a permeate side of a stained membrane obtained by supplying a water-to-be-treated including a staining agent to the reverse osmosis membrane to stain the reverse osmosis membrane.

13 Claims, 3 Drawing Sheets

(51) Int. Cl.
    *B01D 61/10*     (2006.01)
    *B01D 63/10*     (2006.01)
    *B01D 65/10*     (2006.01)
    *G01N 1/34*     (2006.01)

(58) Field of Classification Search
    CPC .... B01D 63/10; B01D 65/109; B01D 65/102; Y02A 20/131
    See application file for complete search history.

(56) References Cited

U.S. PATENT DOCUMENTS

| | | |
|---|---|---|
| 2016/0279575 A1 | 9/2016 | Kobuke et al. |
| 2024/0123408 A1* | 4/2024 | Nakatsuji ............... B01D 65/10 |

FOREIGN PATENT DOCUMENTS

| | | |
|---|---|---|
| JP | 2007260497 A | 10/2007 |
| JP | 2011020047 A | 2/2011 |
| JP | 2018167207 A | 11/2018 |
| KR | 10-2011-0066376 A | 6/2011 |
| WO | 2015063975 A1 | 5/2015 |

OTHER PUBLICATIONS

Extended European Search Report issued Feb. 12, 2025, by the European Patent Office in corresponding European Patent Application No. 22775859.6-1014. (10 pages).

* cited by examiner

METHOD FOR INSPECTING DAMAGE IN REVERSE OSMOSIS MEMBRANE

CROSS REFERENCE TO RELATED APPLICATIONS

This application is the U.S. National Phase of PCT/JP2022/014666, filed Mar. 25, 2022, which claims priority to Japanese Patent Application No. 2021-052866, filed Mar. 26, 2021, the disclosures of these applications being incorporated herein by reference in their entireties for all purposes.

FIELD OF THE INVENTION

The present invention relates to a damage inspection method for a reverse osmosis membrane.

BACKGROUND OF THE INVENTION

In recent years, depletion of water resources is becoming more serious, and utilization of water resources that have not been used is being considered. Especially, a technique of producing drinking water from seawater, which is the most familiar and cannot be used as it is, a so-called "seawater desalination technique", and furthermore, a recycling technique of purifying sewage and wastewater and recycling treated water are attracting attention. In the related art, seawater desalination has been put into practical use mainly by an evaporation method in the Middle East region, where water resources are extremely scarce and thermal resources from petroleum are very abundant. Recently, technical progress in a reverse osmosis membrane method has led to improvements in reliability and cost reductions, and in the Middle East region, reverse osmosis membrane method seawater desalination plants have been put to practical use. With respect to the recycling of sewage and wastewater, the reverse osmosis membrane method is applied in inland and coastal urban and industrial areas where there are no water sources or where an amount of discharge is restricted due to drainage regulations. Especially in Singapore, after treating the sewage generated in the country, reverse osmosis membranes are used for recycling until water quality reaches a drinking water level, so as to respond to water shortage.

The reverse osmosis membrane method, which is applied to seawater desalination and recycling of sewage and wastewater, is a water production method that obtains desalted water by applying a pressure higher than an osmotic pressure to water containing solutes such as salts so that the water permeates the reverse osmosis membrane. This technique can be used to obtain drinking water from, for example, seawater and brackish water, and has also been used for production of industrial ultrapure water, drainage treatment, recovery of valuables, and the like.

However, during normal operation in various water treatment plants, since the reverse osmosis membrane is exposed to high pressure for a long period of time, and even though pretreatment is applied according to quality of raw water taken, foreign substances remaining in the water-to-be-treated and scales and foulants generated during operation are come into contact with a membrane surface of the reverse osmosis membrane, physical damage may occur on the membrane surface of the reverse osmosis membrane. Therefore, it is necessary to periodically investigate presence or absence of physical damage on the membrane surface of the reverse osmosis membrane, and if physical damage occurs, it is necessary to take immediate measures to deal with damage factors.

As a method for investigating the presence or absence of physical damage on the membrane surface of the reverse osmosis membrane, a method of cross-flowing a staining solution (solution of Basic Violet 1 (manufactured by Tokyo Chemical Industry Co., Ltd.)) at a linear velocity of 0.1 cm/sec to 0.2 cm/sec on a skin layer side of a reverse osmosis flat membrane to be investigated, passing water under pressure for 30 minutes or more at an operating pressure of 1.5 MPa, and visually observing whether there is a stained area on the membrane to be evaluated, is known (see Patent Literature 1).

PATENT LITERATURE

Patent Literature 1: WO2015/063975

SUMMARY OF THE INVENTION

However, according to findings of the present inventors, if scales and foulants are attached to the supply side (skin layer side) of the reverse osmosis membrane used in various water treatment plants, attachments on the supply side are stained by the staining solution, and if polyamide, which is a main component of a functional layer exhibiting a basic performance of the reverse osmosis membrane, is oxidatively deteriorated due to contact with oxidizing substances remaining in the water-to-be-treated, the entire functional layer is stained by the staining solution, and due to these reasons, it becomes difficult to distinguish between damaged portions and undamaged portions of the membrane surface as stained areas and unstained areas.

Therefore, an object of the present invention is to provide a membrane damage inspection method for a reverse osmosis membrane, which can determine the presence or absence of physical damage on the membrane surface of the reverse osmosis membrane or a degree of physical damage in an extremely simple and quick manner, and can identify a membrane surface damage rate and damage factors with high accuracy.

In order to solve the above problem, the present invention has the following configurations.

(1) A damage inspection method for a reverse osmosis membrane,
in which at least one of: presence or absence of physical damage; and a degree of physical damage in a reverse osmosis membrane is inspected based on presence or absence of a stained area on at least a permeate side of a stained membrane obtained by supplying a water-to-be-treated including a staining agent to the reverse osmosis membrane to stain the reverse osmosis membrane.

(2) The damage inspection method for a reverse osmosis membrane according to (1), in which the stained membrane is further subjected to at least one of a washing of the following (i) and (ii) to wash the water-to-be-treated including the staining agent remaining on a surface of the stained membrane and inspect at least one of: presence or absence of physical damage; and a degree of physical damage in the reverse osmosis membrane based on presence or absence of the stained area on at least the permeate side of the stained membrane:
(i) supplying washing water to the stained membrane by a pressurizing-supply unit at a pressure equal to or higher than an osmotic pressure of the washing water to separate the washing water into a concentrate and a permeate;
(ii) washing the stained membrane by pouring a washing agent including 5 mass % or more of a surfactant over the stained membrane.
(3) A damage inspection method for a reverse osmosis membrane,
in which a plurality of reverse osmosis membranes are prepared and divided into two or more groups,
one of the two or more groups is at least subjected to the damage inspection method for a reverse osmosis membrane according to (1) or (2),
one or more groups of the remaining groups are subjected to the damage inspection method for a reverse osmosis membrane according to (1) or (2) after the reverse osmosis membranes are prewashed, and
a damage factor is identified from comparison of inspection results of each group.
(4) The damage inspection method for a reverse osmosis membrane according to (3), in which
a prewashing method for the reverse osmosis membranes in the one or more groups of the remaining groups is at least one of the following (iii) to (v):
(iii) immersing the reverse osmosis membrane in at least one solution selected from the group consisting of a solution with a pH of less than 4, a solution with a pH of 10 or more, and a solution including 0.5 wt % or more of a chelating agent, for 1 hour or more;
(iv) supplying the solution to the reverse osmosis membrane by a pressurizing-supply unit at a pressure equal to or higher than an osmotic pressure of the solution to separate the solution into a concentrate and a permeate;
(v) washing the reverse osmosis membrane by pouring the solution over the reverse osmosis membrane.
(5) The damage inspection method for a reverse osmosis membrane according to (1) or (2), in which
at least one of: presence or absence of physical damage; and a degree of physical damage in the reverse osmosis membrane is inspected, or a damage factor is identified, by comparing presence or absence of the stained area on the permeate side and a raw water side of the stained membrane.
(6) The damage inspection method for a reverse osmosis membrane according to (5), in which
the damage factor is classified as physical damage or chemical damage based on a ratio of the stained area between the permeate side and the raw water side of the stained membrane.
(7) The damage inspection method for a reverse osmosis membrane according to any one of (1) to (6), in which
a damage rate of the reverse osmosis membrane is identified from the stained area on the permeate side of the stained membrane.
(8) The damage inspection method for a reverse osmosis membrane according to (7), in which
the damage rate of the reverse osmosis membrane is identified from a staining ratio of an inspection area on at least the permeate side of the stained membrane and the stained area included in the inspection area.
(9) The damage inspection method for a reverse osmosis membrane according to (8), in which
at least the permeate side of the stained membrane is imaged by an imaging unit, and the damage rate of the reverse osmosis membrane is identified from a staining ratio of an inspection area on at least a permeate side image of the stained membrane and the stained area included in the inspection area.
(10) The damage inspection method for a reverse osmosis membrane according to (9), in which
the staining ratio is a ratio of either a total area or a total number of pixels of the inspection area of at least the permeate side image of the stained membrane and the stained area included in the inspection area, and the damage rate of the reverse osmosis membrane is identified by either of the following Determinations 1 and 2:
(Determination 1)
damage rate [%]=(total area of stained area included in inspection area [$mm^2$]/total area of inspection area [$mm^2$])×100;
(Determination 2)
damage rate [%]=(total number of pixels in stained area included in inspection area [pixel]/total number of pixels in inspection area [pixel])×100.
(11) The damage inspection method for a reverse osmosis membrane according to (10), in which
a reverse osmosis membrane B before use is used as a standard, and a reverse osmosis membrane A after use is used as an inspection object, and an average membrane damage speed of the reverse osmosis membrane A is identified by the following Determination 3:
(Determination 3)
average membrane damage speed [%/day] of reverse osmosis membrane A after use=(damage rate [%] of reverse osmosis membrane A—damage rate [%] of reverse osmosis membrane B)/water passing period [day] of reverse osmosis membrane A.
(12) The damage inspection method for a reverse osmosis membrane according to any one of (1) to (11), in which
two or more staining agents having different molecular sizes are used as the staining agent.
(13) The damage inspection method for a reverse osmosis membrane according to any one of (1) to (12), in which
the staining agent has a molecular weight of 300 or more.

According to the present invention, it is possible to determine the presence or absence of physical damage on the membrane surface of the reverse osmosis membrane and/or the degree of physical damage in an extremely simple and quick manner, and to identify a membrane surface damage rate and damage factors with high accuracy. By immediately taking measures against the identified damage factors, it becomes possible to achieve stable operation of the reverse osmosis membrane in the water treatment plants, and to obtain fresh water stably and inexpensively.

DETAILED DESCRIPTION OF EMBODIMENTS OF THE INVENTION

Embodiments of the present invention will be described in detail below with reference to the drawings, but the present invention is not limited by these embodiments.

Note that in the present description, "mass" is synonymous with "weight".

In a damage inspection method for a reverse osmosis membrane according to the present invention, for a stained membrane obtained by staining a reverse osmosis membrane by supplying water-to-be-treated containing a staining agent to the reverse osmosis membrane, at least one of presence or absence of physical damage and a degree of physical damage in the reverse osmosis membrane is inspected based on presence or absence of a stained area on at least a permeate side of the stained membrane.

Figure 1:
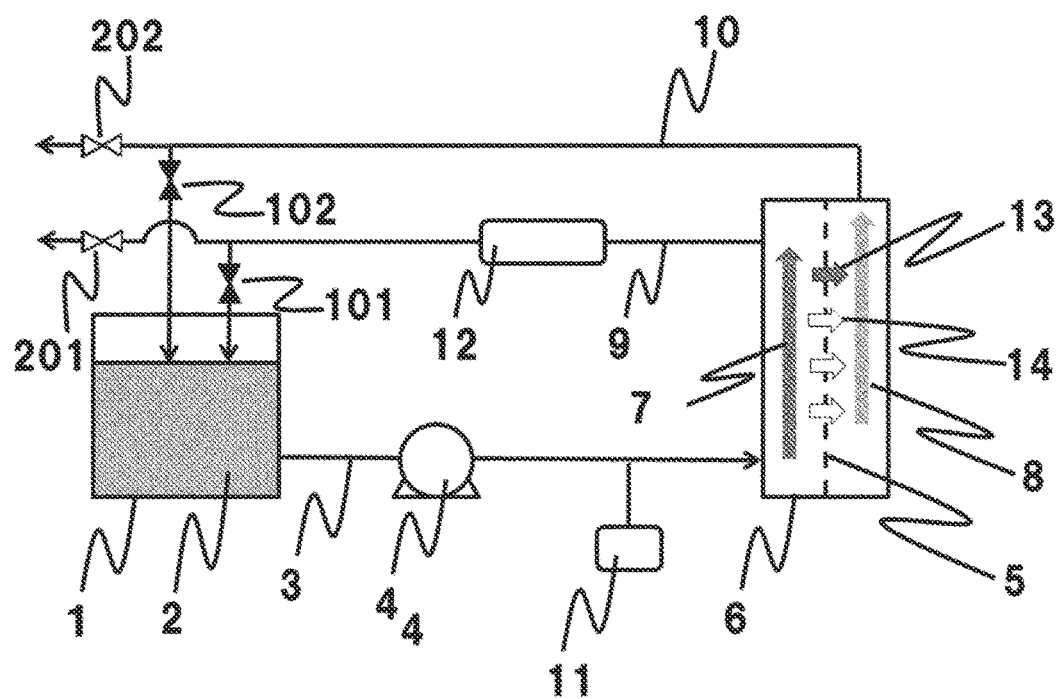
FIG. 1 is a diagram showing a reverse osmosis membrane pressurized staining flow in a damage inspection method for a reverse osmosis membrane according to a first embodiment.

FIG. 1 shows a reverse osmosis membrane staining flow in a damage inspection method for a reverse osmosis membrane according to a first embodiment. As shown in FIG. 1, in the damage inspection method for a reverse osmosis membrane according to the first embodiment, a staining agent is added to water-to-be-treated 2 stored in a water-to-be-treated tank 1 to a predetermined concentration. Then, after pressurizing to a pressure higher than an osmotic pressure of the water-to-be-treated by a pressurizing-supply unit 4 provided in a water-to-be-treated supply line 3, a reverse osmosis membrane evaluation cell 6 attached with a reverse osmosis membrane 5 to be inspected for damage is supplied with the water-to-be-treated 2 containing the staining agent, and the reverse osmosis membrane 5 separates the water-to-be-treated containing the staining agent into a concentrate 7 and a permeate 8.

The concentrate 7 is returned to the water-to-be-treated tank 1 through a concentrate line 9 by opening a concentrate circulation valve 101 and closing a concentrate drain valve 201, and the permeate 8 is returned to the water-to-be-treated tank 1 through a permeate line 10 by opening a permeate circulation valve 102 and closing a permeate drain valve 202. A supply pressure after pressurizing the water-to-be-treated by the pressurizing-supply unit 4 is measured by a pressure gauge 11 provided in the water-to-be-treated supply line 3 and adjusted to a predetermined pressure, and a flow rate of the concentrate 7 is measured by a concentrate flow meter 12 provided in the concentrate line 9 and adjusted to a predetermined flow rate. After setting pressurized staining conditions for the reverse osmosis membrane, the water-to-be-treated 2 containing the staining agent is permeated through the reverse osmosis membrane 5 for a certain period of time, and then the permeate 8 in which a water-to-be-treated mixed flow 13 generated in a physically damaged portion of the reverse osmosis membrane 5 and a reverse osmosis membrane permeate flow 14 generated in an undamaged portion are mixed is obtained. Since the reverse osmosis membrane permeate side is stained by the water-to-be-treated mixed flow 13 generated in the physically damaged portion of the reverse osmosis membrane 5 only when there is a physically damaged portion, at least one of the presence or absence of physical damage and the degree of physical damage in the reverse osmosis membrane 5 is inspected based on the presence or absence of a stained area on the reverse osmosis membrane permeate side.

Examples of a solvent used for the water-to-be-treated include pure water, distilled water, tap water, seawater, rain water, industrial water, and well water, and pure water containing no components other than the staining agent is more preferable since no physical damage or chemical damage to the membrane will be caused during staining.

The supply pressure of the water-to-be-treated is preferably 0.2 MPa to 8.0 MPa, and more preferably 0.4 MPa or more, and more preferably 5.5 MPa or less from the viewpoint of efficiently separating the water-to-be-treated into concentrate and permeate.

From the viewpoint of efficient staining, the flow rate of the concentrate is preferably 0.1 L/min to 10 L/min, more preferably 1 L/min or more and more preferably 5 L/min or less.

Although the staining conditions for the reverse osmosis membrane according to the first embodiment are not particularly limited, the staining is performed under, for example, the following conditions.

<Staining Conditions>
  Staining agent and addition concentration: methyl violet aqueous solution, 500 mg/L
  Supply pressure of water-to-be-treated: 0.4 MPa (osmotic pressure of water-to-be-treated or more)
  Concentrate flow rate: 3.5 L/min
  Pressurized staining time: 15 minutes
  Membrane sample (size): reverse osmosis membrane, circular flat membrane (diameter: 75 mm)

Although the number of the reverse osmosis membrane evaluation cells 6 is not particularly limited, for example, it is preferable to provide a plurality of reverse osmosis membrane evaluation cells in series or in parallel, so that a plurality of reverse osmosis membranes can be inspected at once, and test efficiency is improved.

Figure 2:
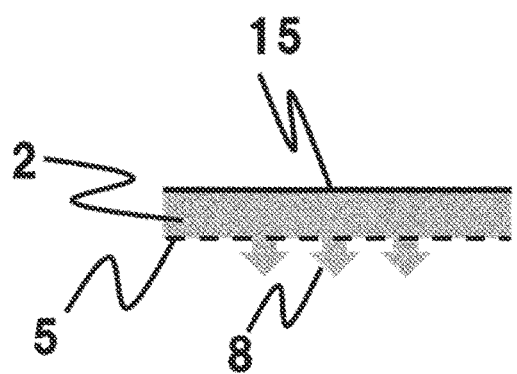
FIG. 2 is a diagram showing a staining method for a reverse osmosis membrane under atmospheric pressure in a damage inspection method for a reverse osmosis membrane according to a second embodiment.

In the reverse osmosis membrane staining in a damage inspection method for a reverse osmosis membrane according to a second embodiment, as shown in FIG. 2, the water-to-be-treated 2 containing the staining agent at a predetermined concentration is supplied under atmospheric pressure to the reverse osmosis membrane 5 to be inspected for damage and allowed to stand for a predetermined period of time. Since the reverse osmosis membrane permeate side is stained by mixing of a staining agent solution generated in the physically damaged portion of the reverse osmosis membrane 5 only when there is a physically damaged portion, at least one of the presence or absence of physical damage and the degree of physical damage to the reverse osmosis membrane 5 is inspected based on the presence or absence of a stained area on the reverse osmosis membrane permeate side.

The concentration of the water-to-be-treated containing the staining agent is preferably 1.0 mg/L to 3000 mg/L, and more preferably 300 mg/L or more and more preferably 1000 mg/L or less, from the viewpoint of color intensity of the stained area.

A standing time is preferably 1 minute to 180 minutes, more preferably 5 minutes or more, still more preferably 10 minutes or more, more preferably 120 minutes or less, and still more preferably 60 minutes or less, from the viewpoint of the color intensity of the stained area.

Although the staining conditions for the reverse osmosis membrane according to the second embodiment are not particularly limited, the staining is performed under, for example, the following conditions. In order to uniformly supply the staining agent solution to the membrane surface, as shown in FIG. 2, a resin film 15 may be placed on the membrane surface to which the water-to-be-treated 2 containing the staining agent is supplied.

<Staining Conditions>
Staining agent and addition concentration: methyl violet aqueous solution, 500 mg/L
Staining time: 15 minutes
Membrane sample (size): reverse osmosis membrane, circular flat membrane (diameter: 75 mm)

After staining the reverse osmosis membrane according to the first embodiment or the second embodiment, if the water-to-be-treated containing the staining agent remains on the membrane surface and it is difficult to distinguish between the stained area and the unstained area, it is preferable to wash a surface of a stained membrane using washing water such as pure water as the water-to-be-treated.

As a washing method for the stained membrane, it is preferable to perform at least one washing of the following (i) and (ii).
(i) Supplying the washing water to the stained membrane by the pressurizing-supply unit at a pressure equal to or higher than an osmotic pressure of the washing water, and separating washing water into concentrate and permeate.
(ii) Washing the stained membrane by pouring a washing agent containing 5 mass % or more of a surfactant over the stained membrane.

Figure 3:
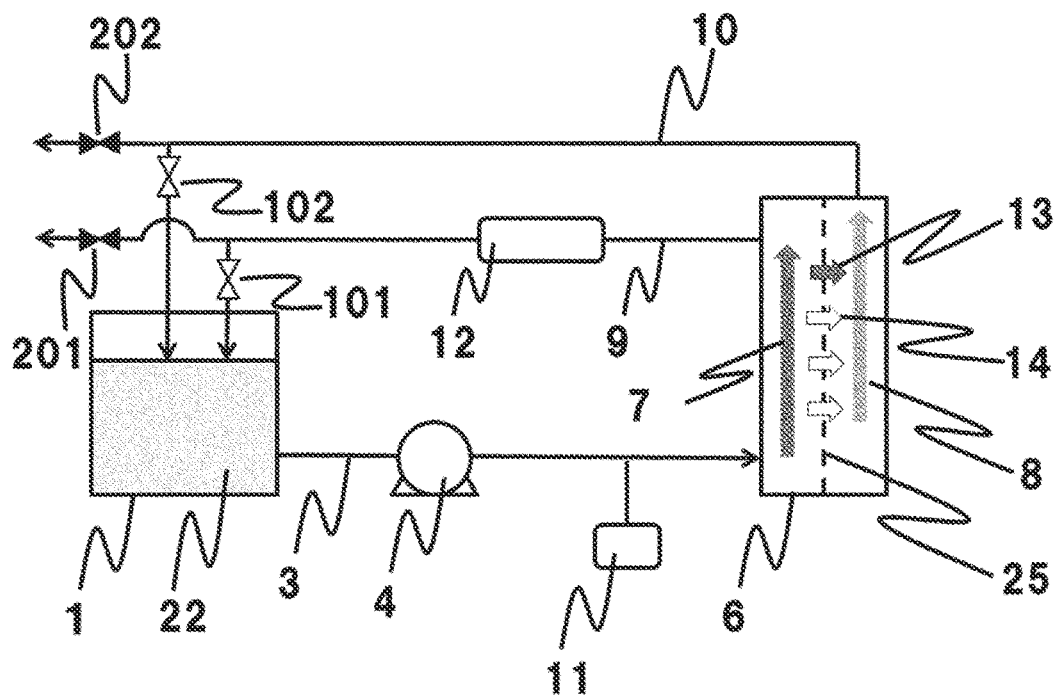
FIG. 3 is a diagram showing a membrane surface washing flow after pressurized staining of the reverse osmosis membrane in the damage inspection method for a reverse osmosis membrane according to the first embodiment.

FIG. 3 shows a membrane surface washing flow after the reverse osmosis membrane staining according to a washing method in the above (i). As shown in FIG. 3, a washing water 22 is stored in the water-to-be-treated tank 1, and is pressurized to a pressure equal to or higher than an osmotic pressure of the washing water 22 by the pressurizing-supply unit 4 provided in the water-to-be-treated supply line 3, and then is supplied to the reverse osmosis membrane evaluation cell 6 attached with the stained reverse osmosis membrane 25, and the reverse osmosis membrane 25 separates the washing water 22 into the concentrate 7 and the permeate 8.

The concentrate 7 is drained out of the system through the concentrate line 9 by closing the concentrate circulation valve 101 and opening the concentrate drain valve 201, and the permeate 8 is drained out of the system through the permeate line 10 by closing the permeate circulation valve 102 and opening the permeate drain valve 202. A supply pressure after pressurizing the washing water by the pressurizing-supply unit 4 is measured by the pressure gauge 11 provided in the water-to-be-treated supply line 3 and adjusted to a predetermined pressure, and a flow rate of the concentrate 7 is measured by the concentrate flow meter 12 provided in the concentrate line 9 and adjusted to a predetermined flow rate. After setting reverse osmosis membrane washing conditions, the membrane surface is washed for 5 minutes or more until the color of the concentrate 7, which is colored by being mixed with the water-to-be-treated containing the staining agent remaining on the membrane surface, becomes the same color as the water-to-be-treated.

The washing conditions for the reverse osmosis membrane after staining are not particularly limited, and the washing is performed under, for example, the following conditions.

<Washing Conditions>
Water-to-be-treated: Washing water (pure water and the like)
Supply pressure of water-to-be-treated: 0.15 MPa (osmotic pressure of water-to-be-treated or more)
Concentrate flow rate: 3.5 L/min
Washing time: 5 minutes or more
Membrane sample (size): reverse osmosis membrane, circular flat membrane (diameter: 75 mm)

Although the washing water is not particularly limited, it is preferable that the staining agent concentration is lower than that of the water-to-be-treated containing the staining agent used for staining, and only the water-to-be-treated containing the staining agent remaining on the membrane surface can be washed without additionally staining the stained membrane with the staining agent. Especially, by using washing water having a staining agent concentration of preferably 1/100 or less and more preferably 1/10,000 or less for the water-to-be-treated containing the staining agent used for staining as the water-to-be-treated, only the water-to-be-treated containing the staining agent remaining on the membrane surface can be washed effectively and efficiently. For example, when the staining agent concentration of the water-to-be-treated containing the staining agent (methyl violet) used for staining is 500 mg/L, by using washing water with a staining agent concentration lower than 500 mg/L, preferably 5 mg/L or less, and more preferably 0.05 mg/L or less, only the water-to-be-treated containing the staining agent remaining on the membrane surface can be washed effectively and efficiently.

Although a method for measuring the concentration of the staining agent is not particularly limited, it can be measured by, for example, the absorptiometric analysis method as described in JIS K 0115:2020 general rules for absorptiometric analysis, ion chromatography as described in JIS K 0127:2013 general rules for ion chromatography, and ICP emission spectroscopic analysis described in JIS K 0116: 2014 general rules for emission spectroscopic analysis.

Furthermore, it is preferable that hypochlorite ions in the washing water is 0.01 mg/L or less equivalent to free chlorine, and it is possible to wash only the water-to-be-treated containing the staining agent remaining on the membrane surface without losing the stained area of the stained membrane due to a bleaching effect of the hypochlorite ions.

Although a method for measuring a concentration of the free chlorine is not particularly limited, it can be measured by an absorptiometric method using a N,N-diethylparaphenylenediamine (DPD) reagent, a colorimetric method, an iodine method, an electric current method (polarographic method), or the like.

By using water that does not contain both a staining agent and hypochlorite ions, such as pure water, as the washing water, it is possible to wash only the water-to-be-treated containing the staining agent remaining on the membrane surface without additionally staining the stained membrane with a staining agent and without losing the stained area of the stained membrane due to the bleaching effect of hypochlorite ions.

Next, a washing method in the above (ii) will be described. If the water-to-be-treated containing the staining agent remains on the membrane surface even after washing the membrane surface after the reverse osmosis membrane staining in the damage inspection method for a reverse osmosis membrane according to the first embodiment and the second embodiment, it is preferable to further perform pouring washing with a washing agent containing 5 mass % or more of a surfactant, so that the water-to-be-treated containing the staining agent remaining on the membrane surface can be sufficiently removed. Although a type of the surfactant is not particularly limited, any of anionic surfactants, cationic surfactants, amphoteric surfactants and nonionic surfactants can be used.

A concentration of the surfactant in the washing agent is preferably a critical micelle concentration of the surfactant or more. For example, in the case of sodium lauryl sulfate, which is a type of anionic surfactant, the concentration thereof is preferably 0.23 mass % or more, and an upper limit thereof is preferably 30 mass % or less, and more preferably 10 mass % or less.

Although a method for measuring the concentration of the surfactant is not particularly limited, the concentration can be measured by gravimetric analysis such as an ion exchange chromatography method, an alumina column chromatography method, and a barium phosphotungstate method described in JIS K 3362:2008 household synthetic detergent test methods, titration methods such as a phase separation titration method, a potassium ferrocyanide method, and a bromophenol blue method described in JIS K 3362:2008 household synthetic detergent test methods, a absorptiometric analysis method described in JIS K 0102: 2013 factory wastewater test methods, chromatography such as high-performance liquid chromatography described in the Waterworks Law, potentiometry, or fluorescence spectroscopy.

After preparing a plurality of the reverse osmosis membranes, dividing the reverse osmosis membranes into two or more groups, and performing different treatments for each group, by performing the damage inspection method for a reverse osmosis membrane according to the first embodiment or the second embodiment, a damage factor can be identified from comparison of inspection results for each group. One of the two or more groups is at least subjected to the damage inspection method for a reverse osmosis membrane according to the first embodiment or the second embodiment, and one or more of the remaining groups of the two or more groups are subjected to the damage inspection method for a reverse osmosis membrane according to the first embodiment or the second embodiment after prewashing the reverse osmosis membranes, and it is preferable to identify the damage factor from the comparison of inspection results for each group.

The prewashing method for the reverse osmosis membranes in one or more of the remaining groups is not particularly limited, and a treatment suitable for removing clogging from the membrane surface is used, and for example, at least one of the following (iii) to (V) is preferable.

(iii) Immersing the reverse osmosis membranes in at least one solution selected from the group consisting of a solution with a pH of less than 4, a solution with a pH of 10 or more, and a solution containing 0.5 wt % or more of a chelating agent for 1 hour or more.

(iv) Supplying the solution to the reverse osmosis membrane by the pressurizing-supply unit at a pressure equal to or higher than an osmotic pressure of the water-to-be-treated, and separating the solution into concentrate and permeate.

(v) Washing the reverse osmosis membrane by pouring the solution over the reverse osmosis membrane.

Specifically, after dividing the reverse osmosis membranes into the following Groups A and B and performing different treatments, each group is subjected to the damage inspection method for a reverse osmosis membrane according to the first embodiment or the second embodiment, and by comparing damage inspection results of Groups A and B, the damage factor can be identified.

A: Reverse osmosis membranes that are not pre-treated.

B: Reverse osmosis membranes that are immersed in a solution with a pH of less than 4 for 1 hour or more.

Since the reverse osmosis membranes in Group A are used as comparison targets for the reverse osmosis membranes in Group B, it is preferable not to perform any treatment on the reverse osmosis membranes in Group A.

By the reverse osmosis membrane staining, the permeate side of the reverse osmosis membrane is stained, and at the same time, a supply side of the reverse osmosis membrane is also stained. In this case, if scale or foulant is attached to the supply side of the reverse osmosis membrane, such as a reverse osmosis membrane used in a water treatment plant, not only is the physically damaged portion stained, but the supply side attachment is stained, and if polyamide, which is a main component of a functional layer that exhibits a basic performance of the reverse osmosis membrane, is oxidatively deteriorated by contact with an oxidizing substance, the entire functional layer is stained.

In the damage inspection method for a reverse osmosis membrane according to the present invention, it is preferable to identify a damage rate of the reverse osmosis membrane from at least the stained area on the permeate side of the stained membrane. By identifying the damage rate of the reverse osmosis membrane used in the water treatment plant, it is possible to recognize a risk of physical damage occurring in the water treatment plant.

Furthermore, by comparing the stained areas on the permeate side and the supply side of the stained membrane, it is possible to identify the damage rate and the damage factor of the reverse osmosis membrane. By identifying the damage factor of the reverse osmosis membrane and immediately taking measures against the identified damage factor, it is also possible to achieve stable operation of the reverse osmosis membrane in the water treatment plant, and to obtain fresh water stably and inexpensively.

Figure 4:
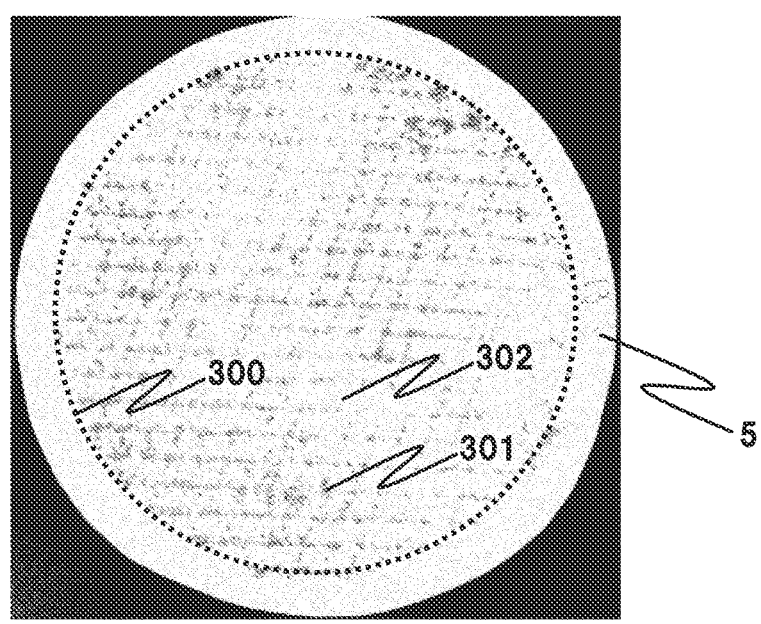
FIG. 4 is a diagram showing an example of a stained membrane permeate side image after reverse osmosis membrane staining in the damage inspection method for a reverse osmosis membrane according to the first embodiment or the second embodiment.

FIG. 4 shows an example of the stained membrane permeate side image after the reverse osmosis membrane staining in the damage inspection method for a reverse osmosis membrane according to the first embodiment or the second embodiment. The damage rate of the reverse osmosis membrane 5 can be identified from an inspection area 300 on at least the permeate side of the stained membrane, and a staining ratio of a stained area 301 included in the inspection area. Although a method for determining the stained area included in the inspection area on at least the permeate side of the stained membrane is not particularly limited, for example, the damage rate of the reverse osmosis membrane is identified by imaging at least the permeate side of the stained membrane with an imaging unit and from the inspection area of at least the permeate side image of the stained membrane and the staining ratio of the stained area included in the inspection area. Furthermore, although the staining ratio is not particularly limited, for example, it is preferable that the staining ratio is a ratio of either a total area or a total number of pixels between the inspection area of at least the permeate side image of the stained membrane and the stained area included in the inspection area, and the damage rate of the reverse osmosis membrane is identified by either of the following Determinations 1 and 2.

(Determination 1)

Damage rate [%]=(total area of stained area included in inspection area [mm$^2$]/total area of inspection area [mm$^2$])×100

(Determination 2)

Damage rate [%]=(total number of pixels [pixel] in stained area included in inspection area/total number of pixels in inspection area [pixel])×100

By this damage inspection method for a reverse osmosis membrane using the imaging unit, it is possible to identify the membrane surface damage rate of the physical damage occurring on the membrane surface of the reverse osmosis membrane in an extremely simple and quick manner with high accuracy, and to quantitatively recognize a risk of physical damage occurring in the water treatment plant. Although the damage rate can be identified from the staining ratio of the inspection area on the reverse osmosis membrane supply side stained by the reverse osmosis membrane staining and the stained area included in the inspection area, if scales or foulants are attached to the supply side of the reverse osmosis membrane such as the reverse osmosis membrane used in the water treatment plant, the attachment on the supply side will be stained, and if polyamide, which is a main component of a functional layer that exhibits basic performance of the reverse osmosis membrane, is oxidatively deteriorated due to contact with oxidizing substances, the entire functional layer will be stained, and it becomes difficult to distinguish between the damaged portion and the undamaged portion of the membrane surface as the stained area and the unstained area. Therefore, it is preferable to identify the damage rate from the staining ratio of the inspection area on the permeate side of the reverse osmosis membrane and the stained area included in the inspection area.

A reverse osmosis membrane B before use is used as a standard, and a reverse osmosis membrane A after use is used as an inspection object, and an average membrane damage speed of the reverse osmosis membrane A after use, which is the inspection object, can be identified by the following Determination 3.

(Determination 3)

Average membrane damage speed [%/day] of reverse osmosis membrane A=(damage rate [%] of reverse osmosis membrane A—damage rate [%] of reverse osmosis membrane B)/water passing period [day] of reverse osmosis membrane A Regarding the reverse osmosis membrane A as the inspection object and the reverse osmosis membrane B as the standard, for example, one of two reverse osmosis membrane elements is used for water to pass through the reverse osmosis membrane element in a water treatment plant, and the reverse osmosis membrane A is taken out from the reverse osmosis membrane element after water passing through, and the reverse osmosis membrane B is taken out from the other reverse osmosis membrane element before water passing through. When the reverse osmosis membrane is used in a water treatment plant, by using the reverse osmosis membrane before use as the reverse osmosis membrane B, which is the standard, and using the reverse osmosis membrane after being used for a certain period of time as the reverse osmosis membrane A, which is the inspection object, and identifying the damage rate of the reverse osmosis membrane A and the damage rate of the reverse osmosis membrane B as the standard by this damage inspection method, the average membrane damage speed of the reverse osmosis membrane A, which is the inspection object, against the reverse osmosis membrane B, which is the standard, can be specified. In this way, it is possible to recognize the risk of physical damage occurring during operation of the water treatment plant for a certain period of time, and to take measures such as improving pretreatment as necessary. Furthermore, by comparing the average membrane damage speed in each water treatment plant, the risk of occurrence of physical damage can be compared between water treatment plants.

Here, the imaging unit is not particularly limited, and for example, imaging equipment such as a camera, a CSI system scanner, or a CCD system scanner is used to image in full color. Especially, it is preferable to image with a CCD system scanner since it is less susceptible to camera shake when imaging with a camera, and it also has a deeper depth of field than a case of imaging with a CSI system scanner, which makes it less susceptible to unevenness of the surface of the reverse osmosis membrane, and the moire is less likely to occur, and there is less variation in contrast in obtained images, and a clear image can be captured.

There is also no particular limitation on imaging conditions of image quality and storage format when imaging with imaging equipment such as a camera, a CSI system scanner, or a CCD system scanner. As for the image quality, since a boundary between the stained area and the unstained area of the stained membrane can be determined with higher accuracy by setting the number of pixels higher, it is effective to image with setting the number of vertical pixels × the number of horizontal pixels of the stained membrane image to 200 dpi (abbreviation of dots per inch)×200 dpi (or 200 ppi (abbreviation of pixel per inch)×200 ppi) or more, preferably 400 dpi×400 dpi (or 400 ppi×400 ppi) or more, and more preferably 600 dpi×600 dpi (or 600 ppi×600 ppi) or more. On the other hand, if the image quality is set to an excessively high number of pixels, an uneven pattern on the surface of the reverse osmosis membrane will be imaged, which may make it difficult to distinguish between the stained area of the stained membrane and the uneven pattern on the surface of the reverse osmosis membrane, and therefore, it is preferable to set the vertical pixel number × horizontal pixel number of the stained membrane image to 1,000 dpi×1,000 dpi (or 1,000 ppi×1,000 ppi) or less.

Although the storage format of the stained membrane image file is not particularly limited, for example, the file may be saved in GIF format (extension=.gif and the like), JPEG format (extension=.jpg/.jpeg/.jpe/.jfif and the like), PNG format (extension=.png and the like), BMP or DIB format (extension=.bmp/.dib/.rle and the like), TIFF format (extension=.tif/.tiff/.nsk and the like) or in any other format (extension=.ico/.ai/.art/.cam/.cdr/.cgm/.cmp/.dpx/.fal/.q0/.fpx/.j6i/.mac/.mag/.maki/. mng/.pcd/.pct/.pic/.pict/.pcx/.pmp/.pnm/.psd/.ras/.sj1/.tga/.wmf/.wpg/.xbm/.xpm and the like). As for the storage format, the JPEG format, PNG format, BMP format, and TIFF format are preferable from the viewpoint of high image quality and high resolution retention, and versatility, and the JPEG format, which is excellent in high image quality and high resolution retention, and versatility, is more preferable.

Although calculation of the ratio between the inspection area of the stained membrane image and the total area of the stained area included in the inspection area is not particularly limited, for example, in the stained membrane image obtained by imaging a circular stained membrane with an imaging unit, a range through which the water-to-be-treated containing the staining agent has passed after the reverse osmosis membrane staining is assumed as the inspection area, and each stained area included in the inspection area is assumed an ellipse, and a major axis α [mm] and a minor axis β [mm] of the stained area is measured, and an area $S_D$ [mm$^2$] of the stained area=π (circular constant)×α×β is calculated, and a sum of the area $S_D$ [mm$^2$] of the stained areas is defined as the total area [mm$^2$] of the stained areas included in the inspection area. Furthermore, the damage rate of the reverse osmosis membrane is identified based on Determination 1 by calculating an area $S_I$ [mm$^2$] of the inspection area=π (circular constant)×{radius R [mm] of the inspection area}$^2$, and assuming a sum of the area $S_I$ [mm$^2$] of the inspection areas as the total area [mm$^2$] of the inspection areas.

Although the calculation of the ratio of the total number of pixels between the inspection area of the stained membrane image and the stained area included in the inspection area is not particularly limited, for example, in a stained membrane image obtained by imaging a circular stained membrane with an imaging unit, a range through which the water-to-be-treated containing the staining agent has passed after the reverse osmosis membrane staining is assumed as the inspection area, and a total number of pixels [pixel] of the stained area included in the inspection area stained by the reverse osmosis membrane staining among the total number of pixels [pixel] of the inspection area is measured, and the damage rate of the reverse osmosis membrane is identified based on Determination 2.

As described above, it is preferable to identify the damage rate of the reverse osmosis membrane as a ratio of either the total area or the total number of pixels between the inspection area of the stained membrane image and the stained area included in the inspection area by either Determination 1 or Determination 2, so that the risk of physical damage occurring in the water treatment plant can be recognized in an extremely simple and quick manner.

Figure 5:
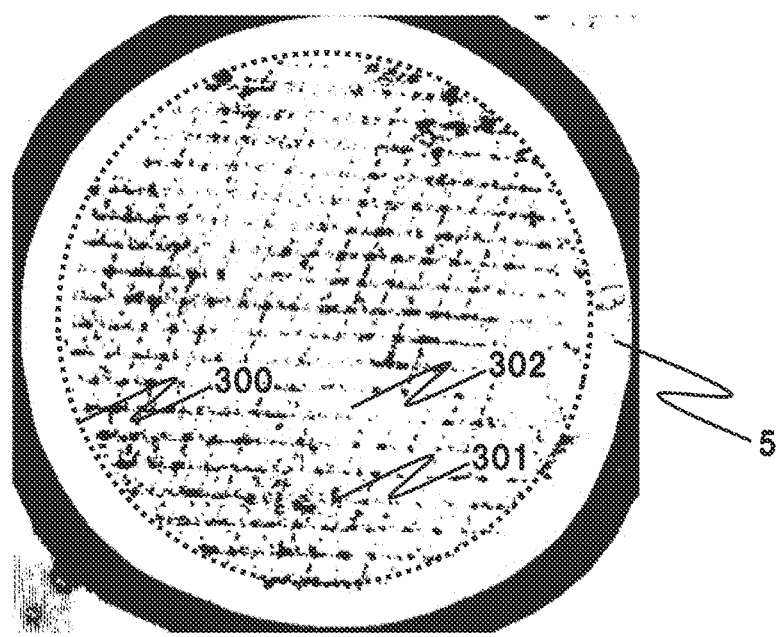
FIG. 5 is a binarized image showing a stained area in black and an unstained area in white within an inspection area obtained by binarizing the stained membrane permeate side image after the pressurized staining of the reverse osmosis membrane in the damage inspection method for a reverse osmosis membrane according to the first embodiment.

When distinguishing between the stained area and the unstained area included in the inspection area of the stained membrane image, it is preferable to convert the full-color stained membrane image into a grayscale (preferably 8-bit grayscale) image expressed with 0 to 256 gradations of light intensity, and to apply binarization processing in advance. By binarizing the stained membrane image, the stained area included in the inspection area is displayed in black (white when black and white is reversed), and the unstained area is displayed in white (black when black and white is reversed), so that the stained area and the unstained area included in the inspection area of the stained membrane image can be easily distinguished. FIG. 5 shows a binarized image obtained by binarizing the stained membrane permeate side image (FIG. 4) after the reverse osmosis membrane staining in the damage inspection method for a reverse osmosis membrane according to the first embodiment or the second embodiment, in which the stained area is shown in black and the unstained area is shown in white within the inspection area. A threshold for the binarization processing is set to one of the light intensity of 0 to 256 gradations, and by setting the threshold value for the minimum stained area included in the inspection area of the stained membrane image to any one point among the light intensity of 0 to 256 gradations that is distinguished as a stained area while minimizing excess and deficiency, the stained area and the unstained area included in the inspection area of the stained membrane image can be distinguished with high accuracy.

For example, by setting the number of vertical pixels × the number of horizontal pixels to 600 dpi×600 dpi and imaging the stained membrane of the reverse osmosis membrane, whose color is white, using a CCD system scanner in full color, converting the stained membrane image saved in JPEG format into an 8-bit grayscale image, and when distinguishing as that the stained area is 256 and the unstained area is 0 among 0 to 256 gradations, setting the threshold of the binarization processing to 247, the stained area and the unstained area included in the inspection area of the stained membrane image can be distinguished with high accuracy. For example, by setting the number of vertical pixels x the number of horizontal pixels to 600 dpi×600 dpi and imaging the stained membrane of the reverse osmosis membrane, whose color is orange, using a CCD system scanner in full color, converting the stained membrane image saved in JPEG format into an 8-bit grayscale image, and when distinguishing as that the stained area is 256 and the unstained area is 0 among 0 to 256 gradations, setting the threshold of the binarization processing to 238, the stained area and the unstained area included in the inspection area of the stained membrane image can be distinguished with high accuracy.

Polymer materials such as cellulose acetate-based polymers, polyamides, polyesters, polyimides, and vinyl polymers can be used as materials of the reverse osmosis membrane to which the present invention can be applied. A membrane structure may be an asymmetric membrane including a dense layer on at least one side of the membrane and fine pores with a gradually increasing pore diameter from the dense layer toward the inside of the membrane or the surface of the other side, or a composite membrane with an extremely thin functional layer made of another material on top of the dense layer of the asymmetric membrane.

The reverse osmosis membrane is generally used as an element having an appropriate form according to a membrane form of the reverse osmosis membrane. The reverse osmosis membrane according to the present invention may be a hollow fiber membrane, a tubular membrane, or a flat membrane, and the element is not particularly limited as long as it has substantial liquid chambers on both sides of the reverse osmosis membrane and can make the liquid permeate under pressure from one surface of the reverse osmosis membrane to the other surface. In the case of the flat membrane, common types include a plate or frame type, in which multiple layers of composite reverse osmosis membranes supported by a frame are stacked, and a spiral type, and these elements are housed in a rectangular or cylindrical housing (such as a pressure vessel) for use. In the case of the hollow fiber membrane and the tubular membrane, a plurality of reverse osmosis membranes are placed in a housing and end portions thereof are potted to form liquid chambers, thereby constituting an element. Such a single element or a plurality of such elements connected in series or in parallel may be used as a liquid separator. Among these element shapes, the spiral type is the most representative. A separation membrane on the flat membrane is wound around a water collecting pipe together with a water-to-be-treated channel material, a permeate channel material, and if necessary, a film for increasing pressure resistance. A net-like or mesh-like grid channel material, a grooved sheet, a corrugated sheet, or the like can be used as the water-to-be-treated channel material. A net-like or mesh-like grid channel material, a grooved sheet, a corrugated sheet, or the like can be used as the permeate channel material. In either case, a net or sheet that is independent from the separation membrane may be used, or an integrated product by adhesion or fusion bonding may also be used.

Figure 6:
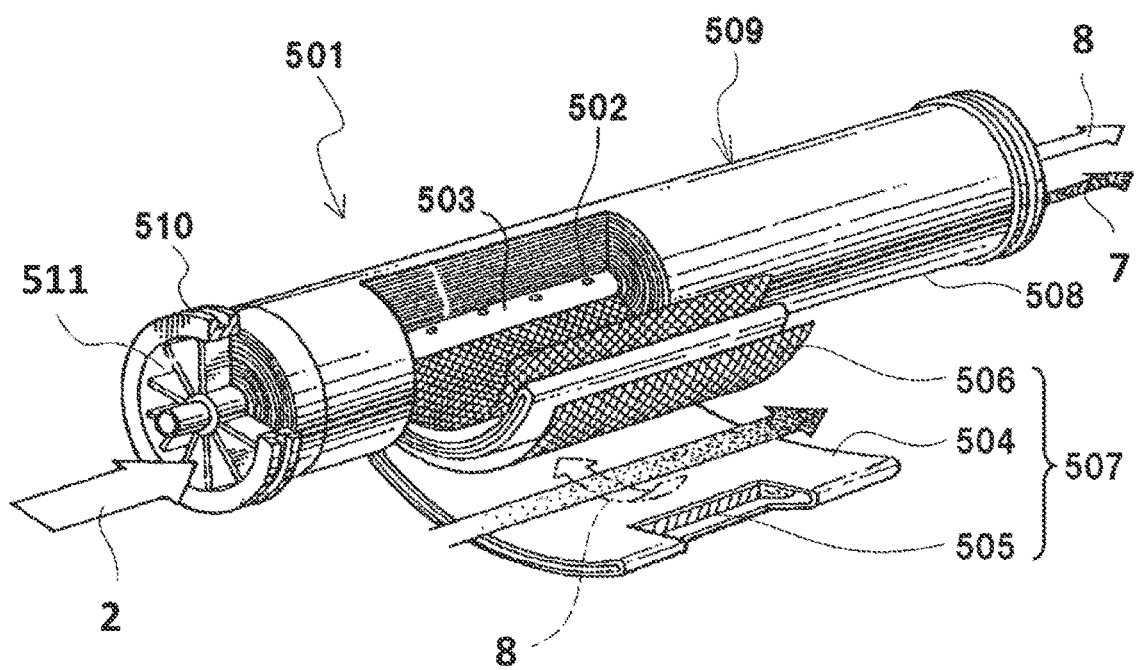
FIG. 6 is a partially exploded perspective view of the most common spiral reverse osmosis membrane element.

FIG. 6 shows a partially exploded perspective view of the most common spiral reverse osmosis membrane element. In a spiral reverse osmosis membrane element 501, generally, a reverse osmosis membrane unit 507 including a reverse osmosis membrane 504, a permeate channel material 505, and a water-to-be-treated channel material 506 is spirally wound around a water collecting pipe 503 having water collecting holes 502, and an exterior body 508 is formed outside the reverse osmosis membrane unit 507, so that a fluid separation element 509 is constituted. End surfaces of the fluid separation element 509 are exposed, and a telescope prevention plate 510 is attached to at least one end portion of the fluid separation element 509 to prevent the fluid separation element 509 from deforming into a telescopic shape.

The water-to-be-treated 2 is supplied to the reverse osmosis membrane unit 507 through the water-to-be-treated channel 512 of the telescope prevention plate 510, is subjected to membrane separation treatment and separated into the permeate 8 and the concentrate 7, and is collected as the permeate 8 in the water collecting pipe 503.

Here, when implementing the membrane damage inspection method according to the present invention for the spiral reverse osmosis membrane element 501 used in various water treatment plants, the spiral reverse osmosis membrane element 501 is dismantled, and for at least one of the reverse osmosis membrane units 507 constituting the spiral reverse osmosis membrane element 501, the reverse osmosis membrane 5 to be inspected for damage is sampled from a portion having a water-to-be-treated separation function of the reverse osmosis membrane 504 constituting the reverse osmosis membrane unit 507.

Although a sampling position is not particularly limited, by performing the membrane damage inspection method according to the present invention by sampling the reverse osmosis membrane 5 to be inspected for damage from two or more different positions in a longitudinal direction of the water collecting pipe 503, it is possible to recognize physical damage distribution of the reverse osmosis membrane 5 inside the spiral reverse osmosis membrane element 501 and distribution of the damage rate or the average membrane damage speed. Similarly, for the plurality of spiral reverse osmosis membrane elements 501 that are used in various water treatment plants by being loaded in series or in parallel, by performing the membrane damage inspection method according to the present invention by sampling the reverse osmosis membranes 5 to be inspected for damage from two or more different spiral reverse osmosis membrane elements 501, it is possible to recognize the distribution of physical damage of the spiral reverse osmosis membrane elements 501 at loading positions of various water treatment plants, and the distribution of the damage rate or the average membrane damage speed.

Physical damage to the reverse osmosis membrane is caused by contact with the water-to-be-treated channel material which is in contact with the surface of the reverse osmosis membrane supply side, or foreign substances such as foulant and scale components supplied together with the water-to-be-treated of the reverse osmosis membrane. For example, the physical damage caused by contact with the grid-like channel material, which is the most common water-to-be-treated channel material on the supply side of the reverse osmosis membrane, is caused by the grid-like channel material being pressed against the membrane surface on the supply side due to an increase in the supply pressure of the water-to-be-treated, or by vibration of the grid-like channel material due to an increase in a linear velocity of the water-to-be-treated on the membrane surface on the supply side, or by offset, and is characterized by having a grid pattern (regular pattern) with a constant size. On the other hand, the physical damage due to contact with foreign substances such as foulant and scale components supplied together with the water-to-be-treated of the reverse osmosis membrane occurs when foreign substances such as foulant and scale components removed by pretreatment of the water-to-be-treated during normal operation of various water treatment plants is supplied to the reverse osmosis membrane while remaining due to deterioration of pretreatment performance or the like, and is characterized by having a random pattern (irregular pattern). That is, when investigating at least one of the presence or absence of physical damage and the degree of physical damage on the membrane surface of the reverse osmosis membrane, by also investigating the pattern and size of the stained area of the stained membrane, it is possible to identify the damage factor of the reverse osmosis membrane, and to immediately take measures against the damage factor.

Although it is also possible to identify the damage factor of the reverse osmosis membrane from the pattern and size of the stained area on the supply side of the reverse osmosis membrane stained by the reverse osmosis membrane staining, if scales or foulants are attached to the supply side of the reverse osmosis membrane such as the reverse osmosis membrane used in the water treatment plant, the attachment on the supply side will be stained, and if polyamide, which is a main component of a functional layer that exhibits basic performance of the reverse osmosis membrane, is oxidatively deteriorated due to contact with oxidizing substances, the entire functional layer will be stained, and it becomes difficult to determine the pattern and size of the stained area. Therefore, it is preferable to identify the damage factor of the reverse osmosis membrane from the pattern and size of the stained area on the permeate side of the reverse osmosis membrane.

In the present invention, it is preferable to classify the damage factor into physical damage or chemical damage based on a ratio of the stained area between the permeate side and a raw water side of the stained membrane stained by the reverse osmosis membrane staining.

The staining agent added to the water-to-be-treated in the reverse osmosis membrane staining is not particularly limited, and for example, a dye or pigment is added to the water-to-be-treated. The dye to be added is also not particularly limited, and examples thereof include triphenylmethane-based basic dyes such as crystal violet, gentian violet, pyoctanin blue, and methyl violet for dyeing in purple, rhodamine B for dyeing in reddish purple, basic black for dyeing in black, malachite green for dyeing in green, methylene blue for dyeing in blue, and bismarck brown B for dyeing in reddish brown. The pigment is not particularly limited, and examples thereof include inorganic pigments and organic pigments. The inorganic pigments are not particularly limited, and examples thereof include white pigments including zinc white, white lead, lithopone, titanium dioxide, precipitated barium sulfate and baryte powder, red pigments including red lead, iron oxide red, and the like, yellow pigments including yellow lead, zinc yellow, and the like, blue pigments including ultramarine blue, Prussian blue (potassium ferrocyanide), YInMn blue, and the like, and black pigments including carbon black and the like. The organic pigments are not particularly limited, and examples thereof include polycyclic pigments such as isoindolinones, isoindolines, azomethines, anthraquinones, anthrone, xanthenes, diketopyrrolopyrroles, perylenes, perinones, quinacridones, indigoids, dioxazines, and phthalocyanines, azo pigments such as monoazo pigments, disazo pigments, and condensed disazo pigments, lake pigments, and fluorescent pigments.

By adding one type of staining agent to the water-to-be-treated in the reverse osmosis membrane staining, the permeate side of the reverse osmosis membrane is stained only when there is a physically damaged portion, so that the presence or absence or the degree of physical damage to the reverse osmosis membrane can be inspected from the presence or absence of the stained area on the permeate side of the reverse osmosis membrane. However, it is preferable to add two or more types of staining agents having different molecular sizes, such as molecular weight or molecular radius, to the water-to-be-treated and inspect the presence or absence of staining on the permeate side of the reverse osmosis membrane with each staining agent, so that the maximum and minimum size of the physically damaged portion can be determined, or the size distribution can be determined.

When two or more staining agents are added to the water-to-be-treated in the reverse osmosis membrane staining, and the colors are mixed and it is not possible to inspect the presence or absence of the stained area on the reverse osmosis membrane permeate side by each staining agent, it is preferable to use staining agents of different colors, or to inspect the presence or absence of the stained area on the permeate side of the reverse osmosis membrane each time one type of staining agent is added in a descending order of molecular sizes, so that it becomes easy to inspect whether there is a stained area on the permeate side of the reverse osmosis membrane by each staining agent.

Although the molecular weight of the staining agent added to the water-to-be-treated in the reverse osmosis membrane staining is not particularly limited, if the molecular weight is too small, the staining agent will permeate through pores of the undamaged portion of the reverse osmosis membrane, and the presence or absence of physical damage and/or the degree thereof to the reverse osmosis membrane cannot be properly inspected based on the presence or absence of the stained area on the permeate side of the reverse osmosis membrane by the staining agent. Therefore, the molecular weight of the staining agent is preferably 300 or more.

EXAMPLES

Results of the damage inspection of the damage inspection method for a reverse osmosis membrane based on the embodiment for performing the present invention will be described.

Example 1

A reverse osmosis membrane element through which water was passed for 180 days at a water treatment plant α using the reverse osmosis membrane element was used.

The water-to-be-treated was prepared by adding 500 mg/L of the staining agent (methyl violet) to pure water, and stored in the water-to-be-treated tank. The water-to-be-treated was pressurized by a supply pump provided in the water-to-be-treated supply line, and was supplied to a reverse osmosis membrane evaluation cell attached with a circular flat reverse osmosis membrane (diameter 75 mm) to be inspected for damage, whose color is white, at a supply pressure of 0.4 MPa and a concentrate flow rate of 3.5 L/min for 15 minutes, and then separated into the concentrate and the permeate. Then, the water-to-be-treated is drained, and pure water is stored in the water-to-be-treated tank, and supplied to the reverse osmosis membrane evaluation cell at a supply pressure of 0.15 MPa and a concentrate flow rate of 3.5 L/min for 5 minutes, so that the membrane surface of the reverse osmosis membrane was washed until the color of the concentrate, which was colored by mixing with the water-to-be-treated containing the staining agent remaining on the membrane surface, became the same color as the pure water.

The permeate side of the reverse osmosis membrane stained with the staining agent is imaged in full color with a CCD system scanner while setting the number of vertical pixels × the number of horizontal pixels to 600 dpi×600 dpi, and the stained membrane image saved in JPEG format was converted into an 8-bit grayscale image, in which black and white were reversed so that the stained area is determined as 256 and the unstained area is determined as 0 among 0 to 256 gradations, and the image was binarized while setting the threshold of the binarization processing to 247. In the stained membrane image after the binarization processing, a range through which the water-to-be-treated containing the staining agent has passed after the reverse osmosis membrane staining is assumed as the inspection area, and among the total number of pixels [pixel] in the inspection area, the total number of pixels [pixel] in the stained area included in the inspection area colored by the reverse osmosis membrane staining was measured, and the damage rate of the reverse osmosis membrane was identified as 10.9% according to the following Determination 2.

$$\text{Damage rate [\%]} = \quad \text{(Determination 2)}$$
$$(\text{total number of pixels [pixel] in stained area included in inspection area/total number of pixels [pixel] in inspection area}) \times 100 =$$
$$(184{,}803/1{,}693{,}606) \times 100 = 10.9$$

Example 2

After identifying the damage rate (=10.9%) of the reverse osmosis membrane A with a water passing period of 180 days in the water treatment plant α using the reverse osmosis membrane element, which was the inspection object in Example 1, the damage inspection was performed in the same manner using an unused reverse osmosis membrane Z with a water passing period of 0 day in the water treatment plant as a standard reverse osmosis membrane, and a damage rate of the standard reverse osmosis membrane Z was identified as 0.0436% as described below.

$$\text{Damage rate [\%] of reverse osmosis membrane } Z = \quad \text{(Determination 2)}$$
$$(\text{total number of pixels [pixel] in stained area included in inspection area/total number of pixels [pixel] in inspection area}) \times 100 =$$
$$(739/1{,}693{,}606) \times 100 = 0.0436$$

As described below, an average membrane damage speed of the reverse osmosis membrane A as the inspection object was identified as 0.0603%/day with respect to the standard reverse osmosis membrane Z.

$$\text{Average membrane damage speed [\%/day]} \quad \text{(Determination 3)}$$
$$\text{of reverse osmosis membrane } A \text{ with respect}$$
$$\text{to standard reverse osmosis membrane } Z =$$
$$(\text{damage rate [\%] of reverse osmosis membrane } A -$$
$$\text{damage rate [\%] of reverse osmosis membrane } Z)/$$
$$\text{water passing period [day] of reverse osmosis}$$
$$\text{membrane } A = (10.9 - 0.0436)/180 = 0.0603$$

Example 3

In addition to Example 2, the damage inspection was performed in the same manner on a reverse osmosis membrane B with a water passing period of 30 days in a water treatment plant β using the reverse osmosis membrane element, and as described below, the damage rate of the reverse osmosis membrane B was identified as 7.20%, and the average membrane damage speed of the reverse osmosis membrane B, which is the inspection object, was identified as 0.239%/day with respect to the standard reverse osmosis membrane Z.

Then, by comparing the average membrane damage speeds of the reverse osmosis membrane A and the reverse osmosis membrane B, which are the inspection objects, with respect to the standard reverse osmosis membrane Z, the water treatment plant β was determined to have a 3.96 times (=0.239 [%/day]/0.0603 [%/day]) higher risk of occurrence of physical damage than the water treatment plant α.

$$\text{Damage rate [\%] of reverse osmosis membrane } B = \quad \text{(Determination 2)}$$
$$(\text{total number of pixels [pixel] in stained}$$
$$\text{area included in inspection area/total number}$$
$$\text{of pixels [pixel] in inspection area}) \times 100 =$$
$$(121{,}991/1{,}693{,}606) \times 100 = 7.20$$

$$\text{Average membrane damage speed [\%/day]} \quad \text{(Determination 3)}$$
$$\text{of reverse osmosis membrane } B \text{ with respect}$$
$$\text{to standard reverse osmosis membrane } Z =$$
$$(\text{damage rate [\%] of reverse osmosis membrane } B -$$
$$\text{damage rate [\%] of reverse osmosis membrane } Z)/$$
$$\text{water passing period [day] of reverse osmosis}$$
$$\text{membrane } B = (7.20 - 0.0436)/30 = 0.239$$

Example 4

A reverse osmosis membrane C and a reverse osmosis membrane D with a water passing period of 180 days in a water treatment plant γ using the reverse osmosis membrane element were prepared.

The reverse osmosis membrane D was immersed in a 1.0 wt % EDTA aqueous solution over one night and then stained by the method described in Example 1.

Thereafter, the damage rates of the reverse osmosis membrane C and the reverse osmosis membrane D were calculated in the same manner as in Example 1. The damage rate of the reverse osmosis membrane C was 1.20%, and the damage rate of the reverse osmosis membrane D was 3.61%, and as a result of comparing these damage rates, since the reverse osmosis membrane D had a higher damage rate, it was identified that fouling was included in the reverse osmosis membrane damage factor in the water treatment plant γ.

$$\text{Damage rate [\%] of reverse osmosis membrane } C = \quad \text{(Determination 2)}$$
$$(\text{total number of pixels [pixel] in stained}$$
$$\text{area included in inspection area/total number}$$
$$\text{of pixels [pixel] in inspection area}) \times 100 =$$
$$(17{,}167/1{,}431{,}420) \times 100 = 1.20$$

$$\text{Damage rate [\%] of reverse osmosis membrane } D = \quad \text{(Determination 2)}$$
$$(\text{total number of pixels [pixel] in stained}$$
$$\text{area included in inspection area/total number}$$
$$\text{of pixels [pixel] in inspection area}) \times 100 =$$
$$(51{,}714/1{,}431{,}420) \times 100 = 3.61$$

Example 5

Regarding the reverse osmosis membrane C, which was the inspection object in Example 4, the supply side of the reverse osmosis membrane was imaged with a CCD system scanner in the same manner as the permeate side of the reverse osmosis membrane in Example 1, and the damage rate on the supply side was identified by inspection. The damage rate on the permeate side was 1.20% and the damage rate on the supply side was 22.4%. From these comparisons, since the damage rate on the supply side is higher, it was identified that not only physical deterioration of the reverse osmosis membrane but also fouling or chemical deterioration is included in the damage factors of the reverse osmosis membrane in the water treatment plant γ.

$$\text{Damage rate [\%] on permeate} \quad \text{(Determination 2)}$$
$$\text{side of reverse osmosis membrane } C =$$
$$(\text{total number of pixels [pixel] in stained}$$
$$\text{area included in inspection area/total number}$$
$$\text{of pixels [pixel] in inspection area}) \times 100 =$$
$$(17{,}167/1{,}431{,}420) \times 100 = 1.20$$

$$\text{Damage rate [\%] on supply} \quad \text{(Determination 2)}$$
$$\text{side of reverse osmosis membrane } C =$$
$$(\text{total number of pixels [pixel] in stained}$$
$$\text{area included in inspection area/total number}$$
$$\text{of pixels [pixel] in inspection area}) \times 100 =$$
$$(320{,}018/1{,}431{,}420) \times 100 = 22.4$$

Comparative Example 1

Only the supply side of the reverse osmosis membrane C, which was the inspection object in Examples 4 and 5, was checked for stained portions, attachment on the membrane surface and the oxidatively deteriorated portion of the reverse osmosis membrane were stained, so that it was difficult to distinguish a boundary from the physically damaged portion, and the damage rate of the reverse osmosis membrane could not be identified.

Although the present invention has been described in detail with reference to specific embodiments, it is apparent to those skilled in the art that various changes and modifications may be made without departing from the spirit and scope of the present invention.

REFERENCE SIGNS LIST

1: water-to-be-treated tank
2: water-to-be-treated
3: water-to-be-treated supply line
4: pressurizing-supply unit
5: reverse osmosis membrane
6: reverse osmosis membrane evaluation cell
7: concentrate
8: permeate
9: concentrate line
10: permeate line
11: pressure gauge
12: concentrate flow meter
13: water-to-be-treated mixed flow
14: reverse osmosis membrane permeate flow
15: resin film
22: washing water
25: reverse osmosis membrane after staining
101: concentrate circulation valve
102: permeate circulation valve
201: concentrate drain valve
202: permeate drain valve
300: inspection area
301: stained area
302: unstained area
501: spiral reverse osmosis membrane element
502: water collecting hole
503: water collecting pipe
504: reverse osmosis membrane
505: permeate channel material
506: water-to-be-treated channel material
507: reverse osmosis membrane unit
508: exterior body
509: fluid separation element
510: telescope prevention plate
511: water-to-be-treated
512: water-to-be-treated channel

What is claimed is:

1. A damage inspection method for a reverse osmosis membrane,
wherein at least one of: presence or absence of physical damage; and a degree of physical damage in a reverse osmosis membrane is inspected based on presence or absence of a stained area on at least a permeate side of a stained membrane obtained by supplying a water-to-be-treated comprising a staining agent to the reverse osmosis membrane to stain the reverse osmosis membrane.

2. The damage inspection method for a reverse osmosis membrane according to claim 1,
wherein the stained membrane is further subjected to at least one of a washing of the following (i) and (ii) to wash the water-to-be-treated comprising the staining agent remaining on a surface of the stained membrane and inspect at least one of: presence or absence of physical damage; and a degree of physical damage in the reverse osmosis membrane based on presence or absence of the stained area on at least the permeate side of the stained membrane:
(i) supplying washing water to the stained membrane by a pressurizing-supply unit at a pressure equal to or higher than an osmotic pressure of the washing water to separate the washing water into a concentrate and a permeate;
(ii) washing the stained membrane by pouring a washing agent comprising 5 mass % or more of a surfactant over the stained membrane.

3. A damage inspection method for a reverse osmosis membrane,
wherein a plurality of reverse osmosis membranes are prepared and divided into two or more groups,
one of the two or more groups is at least subjected to a damage inspection method for a reverse osmosis membrane,
one or more groups of the remaining groups are subjected to a damage inspection method for a reverse osmosis membrane after the reverse osmosis membranes are prewashed, and
a damage factor is identified from comparison of inspection results of each group,
wherein the damage inspection method of the one of the two or more groups and the damage inspection method of the one or more groups of the remaining groups is the damage inspection method according to claim 1.

4. The damage inspection method for a reverse osmosis membrane according to claim 3,
wherein a prewashing method for the reverse osmosis membranes in the one or more groups of the remaining groups is at least one of the following (iii) to (v):
(iii) immersing the reverse osmosis membrane in at least one solution selected from the group consisting of a solution with a pH of less than 4, a solution with a pH of 10 or more, and a solution comprising 0.5 wt % or more of a chelating agent, for 1 hour or more;
(iv) supplying the solution to the reverse osmosis membrane by a pressurizing-supply unit at a pressure equal to or higher than an osmotic pressure of the solution to separate the solution into a concentrate and a permeate;
(v) washing the reverse osmosis membrane by pouring the solution over the reverse osmosis membrane.

5. The damage inspection method for a reverse osmosis membrane according to claim 1,
wherein at least one of: presence or absence of physical damage; and a degree of physical damage in the reverse osmosis membrane is inspected, or a damage factor is identified, by comparing presence or absence of the stained area on the permeate side and a raw water side of the stained membrane.

6. The damage inspection method for a reverse osmosis membrane according to claim 5,
wherein the damage factor is classified as physical damage or chemical damage based on a ratio of the stained area between the permeate side and the raw water side of the stained membrane.

7. The damage inspection method for a reverse osmosis membrane according to claim 1,
wherein a damage rate of the reverse osmosis membrane is identified from the stained area on the permeate side of the stained membrane.

8. The damage inspection method for a reverse osmosis membrane according to claim 7, wherein the damage rate of the reverse osmosis membrane is identified from a staining ratio of an inspection area on at least the permeate side of the stained membrane and the stained area included in the inspection area.

9. The damage inspection method for a reverse osmosis membrane according to claim 8,
wherein at least the permeate side of the stained membrane is imaged by an imaging unit, and the damage rate of the reverse osmosis membrane is identified from a staining ratio of an inspection area on at least a permeate side image of the stained membrane and the stained area included in the inspection area.

10. The damage inspection method for a reverse osmosis membrane according to claim 9,
wherein the staining ratio is a ratio of either a total area or a total number of pixels of the inspection area of at least the permeate side image of the stained membrane and the stained area included in the inspection area, and the damage rate of the reverse osmosis membrane is identified by either of the following Determinations 1 and 2:

(Determination 1)
damage rate [%]=(total area of stained area included in inspection area [mm$^2$]/total area of inspection area [mm$^2$])×100;

(Determination 2)
damage rate [%]=(total number of pixels in stained area included in inspection area [pixel]/total number of pixels in inspection area [pixel])×100.

11. The damage inspection method for a reverse osmosis membrane according to claim 10,
wherein a reverse osmosis membrane B before use is used as a standard, and a reverse osmosis membrane A after use is used as an inspection object, and an average membrane damage speed of the reverse osmosis membrane A is identified by the following Determination 3:

(Determination 3)
average membrane damage speed [%/day] of reverse osmosis membrane A after use = (damage rate [%] of reverse osmosis membrane A—damage rate [%] of reverse osmosis membrane B)/water passing period [day] of reverse osmosis membrane A.

12. The damage inspection method for a reverse osmosis membrane according to claim 1,
wherein two or more staining agents having different molecular sizes are used as the staining agent.

13. The damage inspection method for a reverse osmosis membrane according to claim 1,
wherein the staining agent has a molecular weight of 300 or more.

* * * * *